May 11, 1943.  B. CASTIGLIA  2,319,037

MODEL BALANCER

Filed Jan. 15, 1941

INVENTOR.
BIAGIS CASTIGLIA.
BY Paul A. Talbot.
ATTORNEY.

Patented May 11, 1943

2,319,037

UNITED STATES PATENT OFFICE 2,319,037

MODEL BALANCER

Biagis Castiglia, New York, N. Y., assignor to Wheel Aligning Necessities, Inc., New York, N. Y., a corporation of New York Application January 15, 1941, Serial No. 374,492

15 Claims. (Cl. 35—19)

My invention relates to a model for demonstrating the effect of unbalanced and balanced wheels and has among its purposes and objects to provide:

A convenient means of demonstrating the effect of an unbalanced wheel.

A hand held wheel balance demonstrating device.

A wheel and a movable weight which may be swung to balance the wheel or moved to unbalance it.

A concentrically swingable weight and friction means for holding the weight within the rim of a wheel.

A swingable weight within a wheel and a stop to limit its travel when positioned to balance the wheel.

A wheel and a handle to hold the wheel while revolving, and a movable weight swingably mounted within the wheel to cause the wheel to be out of balance or in balance.

I accomplish these and other objects by the construction herein described and shown in the accompanying drawing forming a part hereof in which.

Similar reference characters refer to similar parts throughout the several views of the drawing and in the specification to follow.

Figure 1:
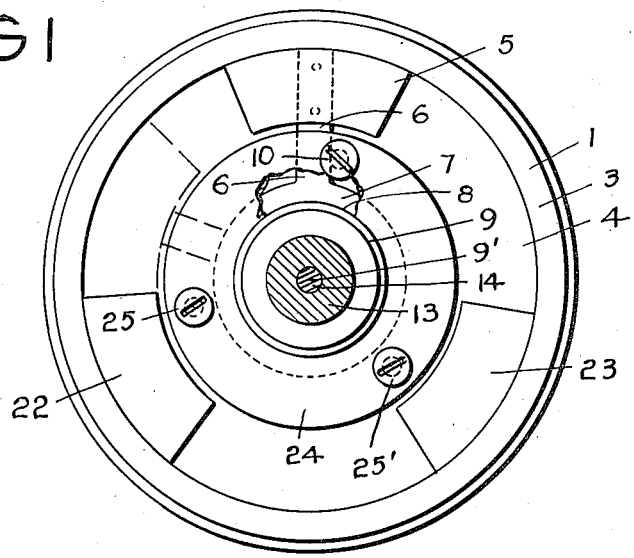
Fig. 1 is a section at 1—1 Fig. 2.
Figure 2:
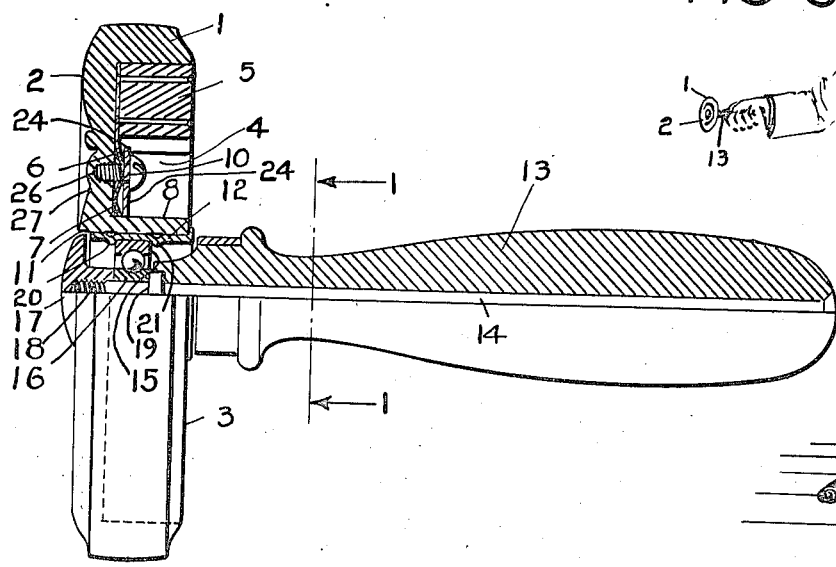
Fig. 2 is a half section and elevation of my device.
Figure 3:
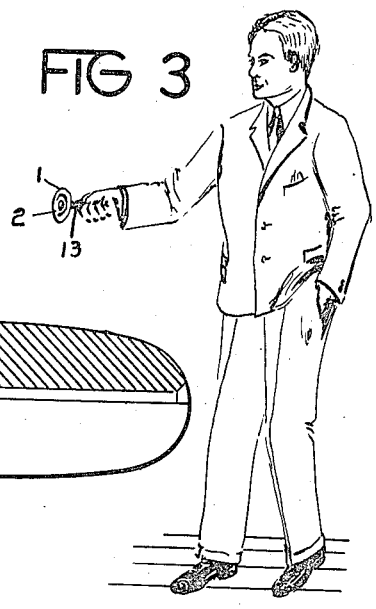
Fig. 3 is a perspective view showing the application of my device.

The users of automobiles often have difficulty in appreciating the importance of having the wheels of their vehicles kept in balance and with this in view, I have provided a simple device which may be held in the hand and spun on a handle to demonstrate graphically what the effect of an unbalanced wheel may do.

My device may be quickly adjusted so that the wheel is out of balance and, with equal ease, may be restored to substantially perfect balance.

When the wheel is out of balance, the arm of person holding the handle will vibrate and difficulty is experienced in holding the handle if the wheel is revolved at fairly high speed. By swinging the movable weight in the wheel to and against a stop, the wheel may quickly be restored to true balance and upon revolving the wheel the handle and arm cease vibrating even though the wheel may be revolved at high speed.

The construction of my demonstrator may be better understood by referring to the drawing:

The wheel 1 is preferably shaped on its outer face 2 to simulate the appearance of an automobile wheel with its tire. The inner face 3 of the wheel is recessed 4 to receive the movable weight 5 which is preferably mounted on the arm 6 which is provided with the bearing ring 7 which is journalled on the outer surface 8 of the hub 9 so that the weight 5 may be swung about the axial center 9' of the wheel.

The free movement of the weight in swinging it to the desired position is restricted by friction or otherwise so that the weight will stay in the position that it is placed.

The weight also is further restricted and limited in its movement and travel by the stop 10 which is so positioned that when the arm 6 is brought against it the wheel will be in perfect balance, thereby making it an easy matter to balance the wheel quickly.

The inner surface 11 of the hub snugly engages the revolvable sleeve 12 of the handle 13 which is provided with a spindle 14 and antifriction bearing 15 on which said sleeve 12 and the wheel 1 freely revolve. The bearing 15, and particularly its inner race 16, may be secured to the spindle 14 by the nut 17 which engages the threaded end 18 of the spindle thereby clamping the bearing between the nut and the shoulder 19 of the spindle. The sleeve 12 may be secured to the bearing by the rolled ridges 20 and 21, or otherwise.

In addition to the movable weight 5, I have provided other or fixed weights 22 and 23, one of which, 22, may serve as a stop for the movable weight when swung to its out of balance or unbalanced position, as may be seen by referring to the broken lines, Fig. 1 of the drawing.

To resist the free movement of the arm 6 and the movable weight 5, I have provided the clamp plate 24 which is preferably secured to the wheel by the screws 25, 25' and the stop 10, all of which engage tapped holes 26 in the web 27 of the wheel 1 and may be adjusted to increase or decrease the frictional resistance against the movement of the arm 6 and weight 5, as well as to permit the weight to be assembled or removed from the wheel.

The arm 6 and the bearing ring 7 may be of springy material and cupped or bent to yield to such irregularities in the recess 4 or on the clamp plate 24 as may exist on their respective surfaces. Because of the friction thus provided, the weight 5 may be swung into or out of the balanced position and held at any position to which it may be moved.

The handle supports the wheel in one hand leaving the other hand free to spin or revolve the wheel at the desired speed which thus demonstrates in a most convincing manner what happens when a wheel is out of balance, as well as in balance. When the wheel is out of balance the handle and the hand holding it vibrate violently, making it difficult to hold and after the movable weight has been swung to the position balancing the wheel, the vibration of the handle ceases and, except for the gyroscopic action, seems to be at rest.

I do not wish to be limited to the details of construction as shown and described in this my disclosure, as the construction may be varied and modified considerably without departing from the principles underlying my invention set forth in the appended claims. This disclosure, however, illustrates a preferred construction for demonstrating wheel balance or unbalance, particularly for automobile wheels.

I claim:

1. In a balance demonstrator, a handle for holding the demonstrator in the hand, a wheel revolvably mounted thereon, a plurality of weights mounted in said wheel, one of said weights being movable, an arm for said movable weight swingable on and about said spindle toward and away from the other of said weights to change the balance of said wheel.

2. In a balance demonstrator, a handle for holding the demonstrator in the hand, a wheel revolvably mounted thereon, a plurality of weights mounted in said wheel, one of said weights being movable, an arm for said movable weight swingable on and about said spindle toward and away from the other of said weights to change the balance of said wheel, and stop means to determine the position of said movable weight when in its balanced position.

3. In a balance demonstrator, a handle for holding the demonstrator in the hand, a wheel revolvably mounted thereon, a plurality of weights mounted in said wheel, one of said weights being movable, an arm for said movable weight swingable on and about said spindle toward and away from the other of said weights to change the balance of said wheel, and friction means resisting the free concentric movement of said movable weight.

4. In a balance demonstrator, a handle for holding the demonstrator in the hand, a wheel revolvably mounted thereon, a plurality of weights mounted in said wheel, one of said weights being movable, an arm for said movable weight swingable on and about said spindle toward and away from the other of said weights to change the balance of said wheel, and means resisting the circular movement of said movable weight.

5. In a device for demonstrating the effect of unbalanced wheels having a handle and a spindle secured thereto and a wheel revolvable thereon normally out of balance, and a movable weight movable on and about the axis of said wheel to a position which balances said wheel to selectively balance or unbalance said wheel.

6. In a device for demonstrating the effect of unbalanced wheels, a handle and a wheel revolvable thereon having a heavy side of unbalance, and a movable weight movable about the axis of rotation of said wheel and in relation to said heavy side, and means predetermining the position of said movable weight when said wheel is balanced, said movable weight having movable mounting means in relation to said wheel.

7. In a device for demonstrating the effect of unbalanced wheels, a handle and an unbalanced wheel revolvable thereon, and a movable weight and securing means therefor movable about the axis of rotation of said wheel, and means retarding the free movement of said movable weight.

8. In a device for demonstrating the effect of unbalanced wheels, a handle and a wheel revolvable thereon normally out of balance, a movable weight movable about the axis of rotation of said wheel, an arm of springy material having a bearing secured to said movable weight, and clamping means holding said arm and weight to swing circumferentially within said wheel, said movable weight balancing said wheel when swung to a predetermined position.

9. In a device for demonstrating the effect of unbalanced wheels, a handle and an unbalanced wheel revolvable thereon, and a movable weight movable in said wheel, an arm of springy material having a bearing secured to said movable weight and swingable on the axis of rotation of said wheel, and a clamp plate engaging said arm and holding said weight to swing within said wheel and retarding the free movement of said weight against movement.

10. In a device for demonstrating the effect of unbalanced wheels, a handle and an unbalanced wheel revolvable thereon, and a movable weight movable in said wheel, an arm of springy material having a bearing secured to swing on the axis of rotation of said wheel and secured to said movable weight, and a clamp plate holding said arm and weight to swing within said wheel and retarding the free movement of said weight, and means adjusting said clamp plate to increase and decrease the resistance in retarding the free movement of said weight.

11. In a device for demonstrating the effect of unbalanced wheels having a handle and an unbalanced wheel revolvable thereon, and a movable weight movable in said wheel, an arm of springy material having a bearing secured to said movable weight, and a clamp plate permitting said weight to swing within and on and about the axis of said wheel, restricting the free movement of said weight, and means adjusting the resistance against the free movement of said weight comprising a screw, said screw providing a stop against the movement of said weight.

12. In a model balancer having a handle and wheel revolvable on said handle, means comprising a fixed weight positioned at the rim of said wheel and a movable weight which may be moved on and about the axial center of the wheel and means swingingly securing said movable weight to said wheel, permitting movement toward and away from said fixed weight selectively to balance or unbalance said wheel.

13. In a wheel balance demonstrator, a wheel and handle on which said wheel is adapted to revolve, said wheel being changeable from in balance to out of balance, a fixed weight secured to said wheel and a movable weight swingably mounted in said wheel and swingable on the axis of rotation of said wheel and movable in relation to said fixed weight selectively to balance or unbalance said wheel.

14. In a wheel balance demonstrator, a wheel and handle on which said wheel is adapted to revolve, said wheel being changeable from in balance to out of balance, a fixed weight secured to said wheel and a movable weight swingably mounted in said wheel and swingable on the axis of rotation of said wheel and movable in relation to said fixed weight selectively to balance or unbalance said wheel, and means predetermining the circumferential position of said movable weight in relation to said wheel when in balance.

15. In a wheel balance demonstrator, a wheel and handle on which said wheel is adapted to revolve, said wheel being changeable from in balance to out of balance, a fixed weight secured to said wheel and a movable weight swingably mounted in said wheel and swingable on the axis of rotation of said wheel and movable in relation to said fixed weight selectively to balance or unbalance said wheel, and means predetermining the circumferential position of said movable weight in relation to said wheel when in balance and friction means retarding the free movement of said movable weight.

BIAGIS CASTIGLIA.